(12) United States Patent
Kim et al.

(10) Patent No.: US 9,088,703 B2
(45) Date of Patent: Jul. 21, 2015

(54) WINDOW FOR PREVENTING CAMERA DISTORTION IN AN ELECTRONIC DEVICE

(71) Applicant: Samsung Electronics Co., Ltd., Gyeonggi-do (KR)

(72) Inventors: Young-Gyun Kim, Gyeonggi-do (KR); Kwang-Jin Bae, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 132 days.

(21) Appl. No.: 13/765,991

(22) Filed: Feb. 13, 2013

(65) Prior Publication Data

US 2013/0215323 A1 Aug. 22, 2013

(30) Foreign Application Priority Data

Feb. 16, 2012 (KR) .................. 10-2012-0015797

(51) Int. Cl.
*H04N 5/225* (2006.01)
*H04M 1/02* (2006.01)
*G03B 11/00* (2006.01)
*G03B 17/02* (2006.01)

(52) U.S. Cl.
CPC ........... *H04N 5/2252* (2013.01); *H04M 1/0264* (2013.01); *H04N 5/2254* (2013.01); *H04N 5/2257* (2013.01); *G03B 11/00* (2013.01); *G03B 17/02* (2013.01); *H04N 5/2251* (2013.01)

(58) Field of Classification Search
None
See application file for complete search history.

(56) References Cited

U.S. PATENT DOCUMENTS

| 4,840,465 | A | * | 6/1989 | Loy et al. ....................... 359/669 |
| 4,902,098 | A | * | 2/1990 | Rollin et al. .................. 359/669 |
| 6,192,194 | B1 | * | 2/2001 | Fuss et al. ........................ 396/6 |
| 2004/0209577 | A1 | | 10/2004 | Park et al. |
| 2005/0226608 | A1 | | 10/2005 | Kwon et al. |
| 2007/0010303 | A1 | | 1/2007 | Jalonen |
| 2009/0110380 | A1 | * | 4/2009 | Fantone et al. ................. 396/27 |
| 2012/0057238 | A1 | * | 3/2012 | Byren et al. ................... 359/588 |

FOREIGN PATENT DOCUMENTS

| CN | 1673791 A | 9/2005 |
| CN | 201601742 U | 10/2010 |
| EP | 0 314 243 A1 | 5/1989 |

* cited by examiner

*Primary Examiner* — Justin P Misleh
(74) *Attorney, Agent, or Firm* — Cha & Reiter, LLC.

(57) ABSTRACT

A window of an electronic device includes a shooting region at a position corresponding to a camera lens assembly. The window includes a front surface, a rear surface, and an inclined surface. The front surface includes the shooting region and is formed in a curved shape. An inclined surface is disposed to have a slope corresponding to a curvature of the front surface in at least a portion of the rear surface corresponding to the shooting region. Therefore, deterioration of image capture quality such as distortion by the camera lens assembly and internal reflection is effectively prevented by the inclined surface.

15 Claims, 9 Drawing Sheets

WINDOW FOR PREVENTING CAMERA DISTORTION IN AN ELECTRONIC DEVICE

CLAIM OF PRIORITY

This application claims, pursuant to 35 U.S.C. §119(a), priority to and the benefit of the earlier filing date of a Korean patent application filed in the Korean Intellectual Property Office on Feb. 16, 2012 and assigned Serial No. 10-2012-0015797, the entire disclosure of which is hereby incorporated by reference.

BACKGROUND OF THE INVENTION

1. Field of the Invention

The present invention relates to an electronic device including an image capturing device for shooting an object. More particularly, the present invention relates to a window for preventing camera distortion in the electronic device.

2. Description of the Related Art

Electronic devices have been developed to have various functions to meet a user's desire. For example, in the case of a mobile communication terminal, a user may listen to various music using an MP3 sound source besides a basic function for communicating with a counterpart user, enjoy web surfing using a wireless Internet network, and download and use various programs using the mobile communication terminal. In addition, the mobile communication terminal has at least one high-pixel image capturing device, including a camera lens assembly, to allow a user to shoot an object and thus capture an image of the object. In particular, not only a still image but also a moving picture, as well as a three dimensional image shooting function, is generally incorporated into electronic devices.

These electronic devices have been fabricated to have a more elegant design and a slimmer volume while having all the above-described various functions. Therefore, manufacturers of the device miniaturize the device while developing functions of the relevant assemblies mounted on the device depending on a relevant function in a more excellent direction and consequently make an effort to reduce an entire volume of the electronic device.

In addition, such electronic devices have a display unit and a key input unit as a data input/output device, and a touchscreen unit that can perform data input/output simultaneously. Generally, the touchscreen unit occupies 90% or more of the front side of the electronic device. Therefore, recently, a window formed of glass or polyethylene terephthalate (PET) is generally disposed on the front side of the electronic device to protect various electronic functional components such as a touch panel, a display panel, etc. disposed inside the electronic device and to form an appearance of a product. In addition, a camera lens assembly for Video Telephony (VT) that should be essentially disposed on the front side of the electronic device is configured to shoot an object via a shooting region provided with the window, such as a circular transparent portion, which is separate from a printing portion, upon which indicia or labels, such as a manufacturer logo or symbols, including button settings, are printed or mounted.

FIG. 2 is a cross-sectional view of a portion of an electronic device 100 in the prior art illustrating that a camera lens assembly of the prior art is mounted inside the electronic device 100.

As illustrated in FIG. 2, in the electronic device 100, a substrate 30 is disposed inside a predetermined space formed by a front case frame 106 and a rear case frame 107. A camera lens assembly 20 is mounted on the substrate 30. Also, a window 110 formed of glass or PET for covering most of the appearance of the front side of the electronic device 100 is installed in the front case frame 106.

In this window 110, a transparent shooting region 114 is disposed in a position corresponding to the camera lens assembly 20, that excludes a display region. Preferably, the portion that also excludes the transparent shooting region 114 is a non-active region 113 and corresponds to a black printing region generally, or other colored printing regions upon which indicia or labels, such as a manufacturer logo or symbols, such as button settings, are printed or mounted.

In addition, the transparent shooting region 114 may include a curved surface determined by the overall design or shape of the electronic device 100. In this case, the transparent shooting region 114 of the upper surface of the window 110 may be formed in a curved shape having a predetermined curvature, and the rear surface 112 of the window 110 is formed as a flat plane generally so that assembly of the required components is easily performed.

However, according to this structure, not only is distortion generated due to refraction by the curved structure of the window's upper surface but also internal reflection occurs that generates an unexpected spot to a screen when an image shot is generated, so that this structure cannot meet a user's expectation and consequently, quality and reliability of the image capturing by the electronic device 100 deteriorate.

In addition, to complement the above-described problems and prevent distortion by the curved upper surface, a lens module of a camera lens assembly should be re-designed.

SUMMARY OF THE INVENTION

An aspect of the present invention is to address at least the above-mentioned problems and/or disadvantages and to provide at least the advantages described below. Accordingly, an aspect of the present invention is to provide a window for preventing camera distortion of an electronic device that can always obtain an image of excellent quality even when formed in a curved shape.

Another aspect of the present invention is to provide a window for preventing camera distortion of an electronic device, implemented to contribute to an excellent design by having no limitation in a shape such as a curved shape when designing an appearance of an electronic device.

Still another aspect of the present invention is to provide a window for preventing camera distortion of an electronic device, implemented to prevent in advance inconvenience and an increase in manufacturing costs caused by re-design of a lens module of a camera lens assembly due to application of a curve-shaped window.

Yet another aspect of the present invention is to provide a window for preventing camera distortion of an electronic device, implemented to obtain excellent shooting quality regardless of design and consequently to contribute to improvement in reliability of the electronic device.

In accordance with an aspect of the present invention, a window of an electronic device including a shooting region in a position corresponding to a camera lens assembly is provided. The window includes an upper surface including the shooting region and formed in a curved shape, a rear surface facing the upper surface, and an inclined surface disposed to have a slope corresponding to a curvature of the upper surface in at least a portion of the rear surface corresponding to the shooting region, wherein deterioration of the camera lens assembly is prevented by the inclined surface.

The curvature of the upper surface may be determined such that a vertical distance between two points, where an extension line of an angle of view in the camera lens assembly and the upper surface meet, is in a range of about 0 mm to 0.05 mm.

When a first line segment, connecting two points where an extension line of an angle of view of the camera lens assembly and the upper surface meet, and a second line segment, extending from a lens center of the camera lens assembly, meet at a right angle, the inclined surface may be formed to have the same slope as a slope of a tangential line that passes through a point of the upper surface positioned on the second line segment. This case may be applicable to both a case where the upper surface is convex and a case where the upper surface is concave.

The shooting region may be formed to have a margin space further, by a predetermined distance D, than two points where an extension line of an angle of view of the camera lens assembly and the upper surface meet to prevent malfunction by assembly tolerance. At this point, the distance D may be determined within a range of about 0.2 mm to 0.3 mm.

Also, both ends of the inclined surface may be formed to be lower than the rear surface, or the included surface may be formed to have a surface starting from the rear surface and lower than the rear surface, and the inclined surface may be formed in a separate inclined member attached to the rear surface.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF THE INVENTION

Figure 1:
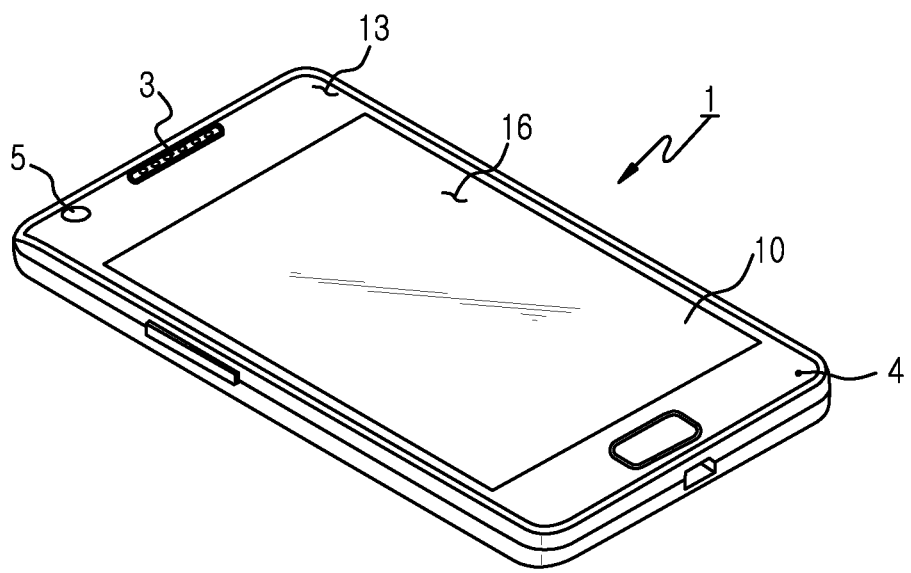
FIG. 1 is a front perspective view illustrating a mobile terminal as an electronic device in which a window is installed according to an exemplary embodiment of the present invention.
Figure 2:
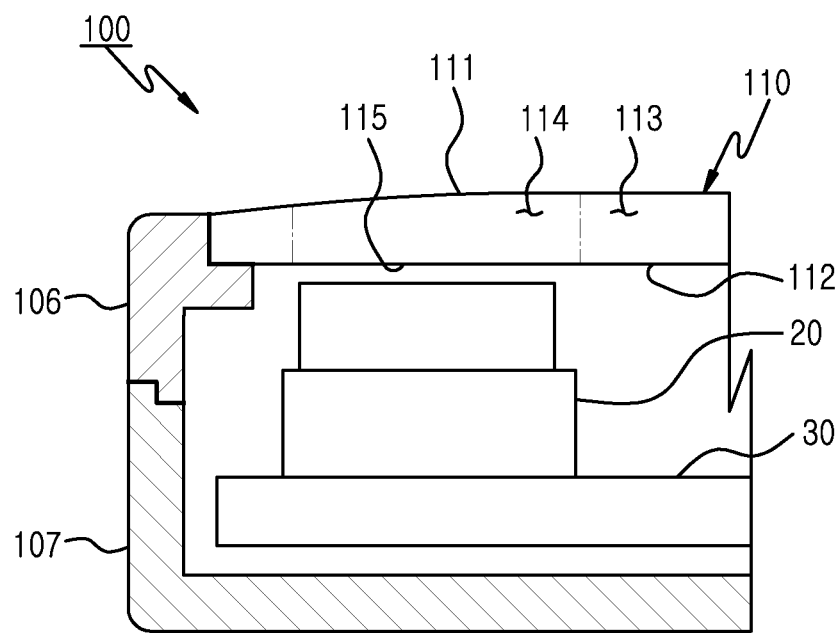
FIG. 2 is a cross-sectional view of a portion of an electronic device in the prior art illustrating that a camera lens assembly of the prior art is mounted inside the electronic device.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention may, however, be embodied in many different forms and should not be construed as limited to the exemplary embodiments set forth herein. Also, terms described herein, which are defined considering the functions of the present invention, may be implemented differently depending on user and operator's intention and practice. Therefore, the terms should be understood on the basis of the disclosure throughout the specification. The principles and features of this invention may be employed in varied and numerous embodiments without departing from the scope of the invention.

The same reference numbers are used throughout the drawings to refer to the same or like parts. Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Though the present invention is described by illustrating a mobile terminal and describing a window applied to the front of a camera for image capture and/or Video Telephony (VT), it is not limited thereto. For example, the present invention is applicable to various electronic devices including a camera lens assembly and various shapes of windows having a curved shape applied to this electronic device.

In addition, although the present invention describes an inclined surface structure of a shooting region formed in a portion of a window applied to an entire appearance of an electronic device, even when a window for a separate camera lens assembly is applied to a curved portion of a window or a case frame of a display unit, the technical construction according to the present invention is applicable to the window for the camera lens assembly.

FIG. 1 is a front perspective view illustrating a mobile terminal as an electronic device in which a window is installed according to an exemplary embodiment of the present invention.

Figure 3:
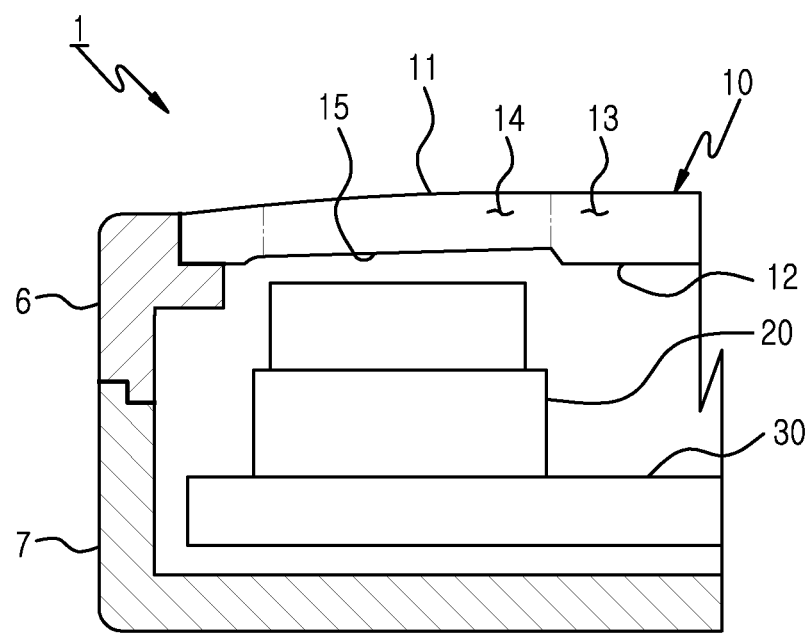
FIG. 3 is a cross-sectional view of a portion of an electronic device illustrating that the window of FIG. 1 is applied to a camera lens assembly according to the exemplary embodiment of the present invention.

Referring to FIGS. 1 and 3, the mobile terminal 1 includes a window 10 installed on a front surface or front portion of the body of the mobile terminal 1. This window 10 may be formed of glass. However, it is not limited thereto but may be formed of PET or any other known transparent and/or translucent material. As shown in FIG. 1 as well as the side cross-sectional view in FIG. 3, the window 10 is divided into an active region 16, in which a display unit is installed, and a non-active region 13. Here, in the case where a touchscreen unit is used as a display unit, the active region 16 and the non-active region 13 may be defined as a touch region and a non-touch region, respectively. Therefore, the active region 16 is formed to be transparent so that a touchscreen unit therein as well as text, symbols, and actuatable icons may be seen, and the non-active region 13 is a printing region where an upper portion and a lower portion of the window 10 has printing or labels mounted thereon. The non-active region 13 may be printed in various colors and may be formed of a black printing region generally, or other colored printing regions upon which indicia or labels, such as a manufacturer logo or symbols, including button settings, are printed or mounted.

In addition, as shown in FIG. 1, openings for exposing an earpiece 3 may be formed in the upper portion of the window 10, and openings for exposing various additional buttons for key input as well as other components, such as a microphone 4, may be formed in the lower portion of the window 10.

A transparent shooting region 14 for shooting an object using a camera 5, having a camera lens assembly 20 installed inside the mobile terminal 1, is disposed on one side of the upper portion of the window 10, as shown in FIGS. 1 and 3. The shooting region 14 is a transparent region excluding the black or colored printing region in the non-active region 13.

In addition, in the mobile terminal 1, a portion of the window 10 is formed having a curved shape. This is formed for implementing an elegant appearance in an aspect of design of the mobile terminal 1. This window 10 is formed by fabricating the upper surface of the mobile terminal 1 and/or the window 10 in a curved shape having a predetermined curvature when initially manufacturing the window 10. Also, the above-described shooting region 14 may be disposed in the curved portion of the window 10. This is because the curved portion of the window 10 may be located at an optimized position with consideration of a mounting position of the camera 5 having the camera lens assembly 20.

In this case, in comparable structures of windows of mobile terminals according to the prior art, distortion or internal reflection occurs due to the curve-shaped structure of the window. In contrast, when the window 10 according to the present invention is implemented as described herein, the above-described problem of distortion in the prior art is resolved.

Figure 4:
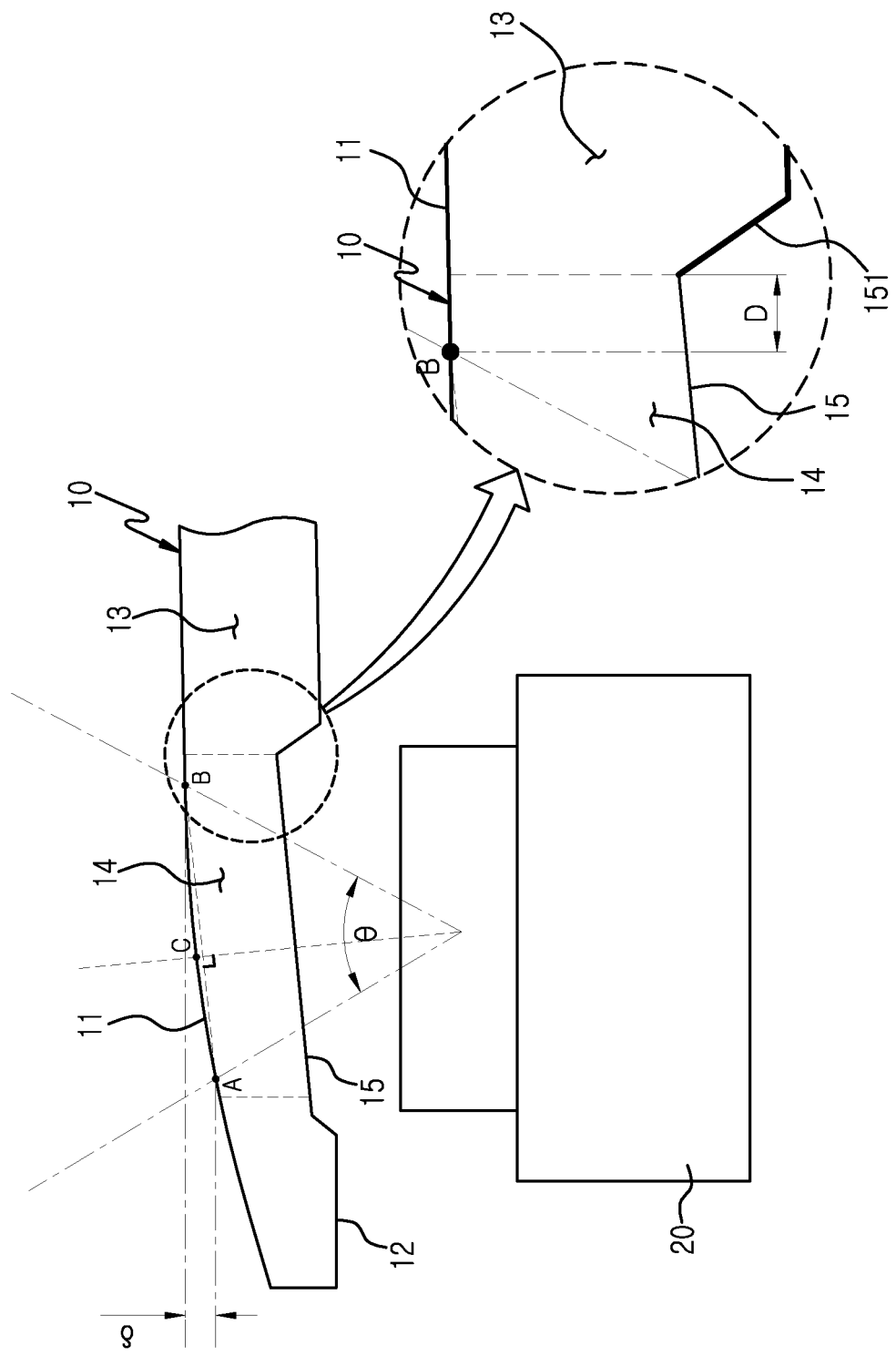
FIG. 4 is a view illustrating a principle of having an inclined surface formed in the window of FIG. 1 according to the exemplary embodiment of the present invention.

FIG. 3 is a cross-sectional view of a portion of an electronic device such as the mobile terminal 1, illustrating that the window 10 of FIG. 1 is applied to the camera 5 having a camera lens assembly 20 according to the exemplary embodiment of the present invention, and FIG. 4 is a view illustrating a principle of having an inclined surface 15 formed in the window 10 of FIG. 1 according to the exemplary embodiment of the present invention.

Referring to FIG. 3, in the mobile terminal 1, a front case frame 6 and a rear case frame 7 are coupled to form a part mounting space for mounting parts and components in an interior space. The substrate 30, and the camera lens assembly 20 are installed in this interior space. Preferably, the camera lens assembly 20 may be mounted on the substrate 30 using a Surface Mounted Device (SMD) method. However, it is not limited thereto and the camera lens assembly 20 may alternatively not be installed on the substrate 30 but may instead be installed separately in a predetermined position of an inner space of the mobile terminal 1 formed by the case frames 6 and 7. In this case, the camera lens assembly 20 may be connected with the substrate 30 by a predetermined electrical connection device such as a cable, etc.

The window 10 is fixedly installed in the front case frame 6, and a portion of the window 10 corresponding to the camera lens assembly 20 is formed as the shooting region 14, and any other portion of the window 10 is a non-active region 13 and is formed as the printing region for logos, indicia, etc. Therefore, when a user views the window 10 from the outside, the user may view only the circular shooting region 14 over the camera 5 illustrated in FIG. 1.

The window 10 includes a curved front surface 11 and a rear surface 12 having the inclined surface 15 according to the present invention. The inclined surface 15 is configured to be inclined with a predetermined slope from one side toward the other side. The forming of this inclined surface 15 is based on a principle that the lens has almost no phase difference due to the inclined surface compared to a phase difference by the front surface 11 formed in the curved upper surface of the window 10. Also, the inclined surface 15 should be formed to have a corresponding slope depending on a degree of curvature of the front surface 11 of the window corresponding to the shooting region 14. Accordingly, the inclined surface 15 prevents deterioration of image capture quality of the camera lens assembly 20.

FIG. 4 is a view illustrating a principle of having an inclined surface formed in the window of FIG. 1 according to the exemplary embodiment of the present invention.

As illustrated in FIG. 4, the shooting region 14 of the window 10 should be formed larger than an angle of view θ of the camera lens assembly 20. Here, the angle of view θ denotes a range in which the camera lens assembly 20 may capture a scene when performing shooting. At this point, a first portion and a second portion where the front surface 11 of the window 10 and an extension line of each ray forming the angle of view θ meet are referred to as "A" and "B", respectively.

According to the present invention, a recommended range regarding a degree of curvature of the shooting region 14 disposed in the window 10 is a range where a vertical distance δ between the above-described points A and B is 0 mm to 0.05 mm.

Also, the inclined surface 15 formed in the rear surface 12 of the window 10 is positioned on a line segment extending from the lens center of the camera lens assembly 20 and meeting, at a right angle, a line segment AB connecting the two points A and B, and formed to have the same slope as a tangential line passing through a point C of the front surface 11 of the window 10. Therefore, the slope of the corresponding inclined surface 15 may change depending on the curved degree of the front surface 11 of the window 10.

In addition, the shooting region 14 of the front surface 11 of the window 10 formed in the curved shape should be formed to have a margin space further to the outside, by a predetermined distance D, than the distance between the points A and B meeting the extending line of the angle of view θ, to prevent malfunction due to assembly and/or manufacturing tolerances. Such assembly and/or manufacturing tolerances may be generated when the camera lens assembly 20 and the substrate 30 are manufactured and/or assembled. Therefore, preferably, this margin interval or distance D is determined to be in the range of 0.2 mm to 0.3 mm as illustrated in FIG. 4.

Also, it is preferable that a portion 151, as a second inclined surface where the rear surface 12 and the inclined surface 15 of the window 10 meet, is formed such that the portion 151 is tapered at a predetermined angle from a portion where the rear surface 12 ends to a portion where the inclined surface 15 starts. In the case where this tapered portion 151 includes the printing region or non-active region 13, a pad printing process having an advantage in printing a curved or inclined surface is preferably performed on this tapered region, unlike a general printing region to which a taping printing process having an advantage in plane printing is applied.

Figure 5:
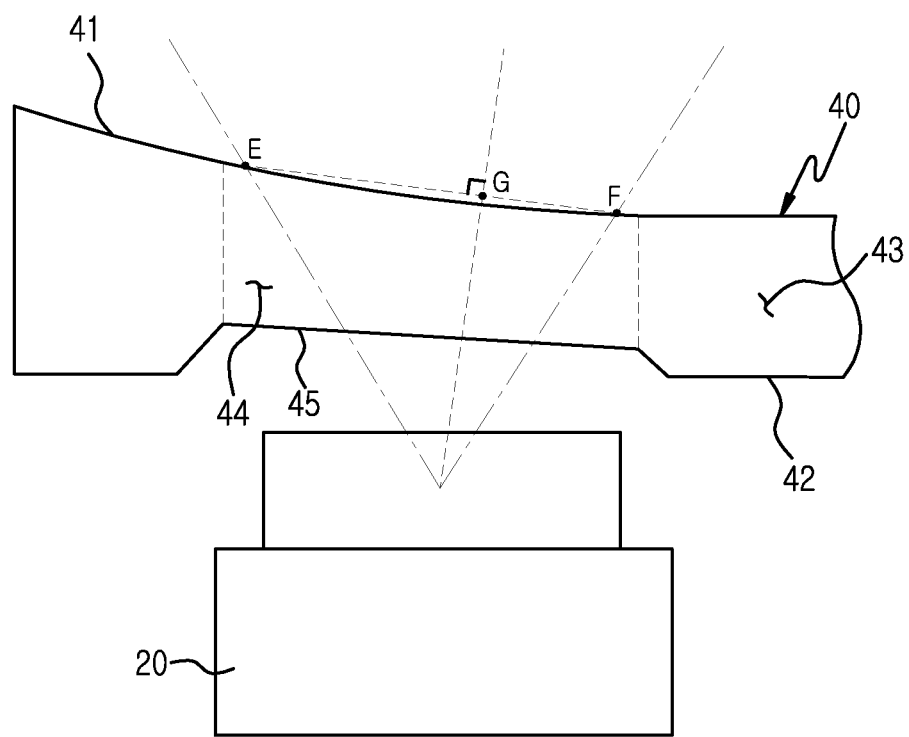
FIG. 5 is a view illustrating a principle of having an inclined surface formed in the window according to an alternative exemplary embodiment of the present invention.

FIG. 5 is a view illustrating a principle of having an inclined surface formed in a window 40 according to an alternative exemplary embodiment of the present invention.

As described above, though an exemplary embodiment of the present 5 invention, as shown in FIGS. 3-4, illustrates the case where the rear surface 12 of the curved window 10, whose front surface 11 is convex upward, has been formed using the inclined surface 15, alternatively an inclined surface 45 is applicable to the curved window 40 whose front surface 41 is concave as illustrated in FIG. 5.

As illustrated in FIG. 5, the slope of the inclined surface 45 formed in the rear surface 42 of the window 40 may be formed such that, when points where an extension line of an angle of view of a lens in a camera lens assembly 20 and the front surface 41 of the window 40 meet are E and F, respectively, the inclined surface 45 is positioned on a line segment extending from the lens center of the camera lens assembly 20 and meeting a line segment connecting the points E and F at a right angle, and has a slope corresponding to a slope of a tangential line passing through the point F of the front surface 41 of the window 40.

In this case, it is preferable that a shooting region 44 of the window 40 is formed to have a margin by a predetermined length in addition to a distance between the points E and F, and a non-active region 43 is formed which may be a printing region.

Also, the above-described inclined surface 45 is formed to have a predetermined slope in the rear surface 42 of the window 40. Therefore, as illustrated in FIG. 5, both sides of the inclined surface 45 do not need to be lower than the rear surface 42. One side of the inclined surface 45 may be formed to coincide with the rear surface 12, and the other side of the inclined surface 45 may be formed to have a portion of the inclined surface 45 lower than the rear surface 42.

Also, in the case where a separated distance between the camera lens assembly 20 and the window 40 is sufficient, a transparent inclined member having a slope corresponding to the curvature of the front surface 41 of the window 40 may be attached to protrude into the shooting region of the rear surface 42 of the window 40. In this case, the inclined member may be attached on the rear surface 42 of the window 40 using an adhesive material such as an Optical Clear Adhesive (OCA).

Figure 6A:
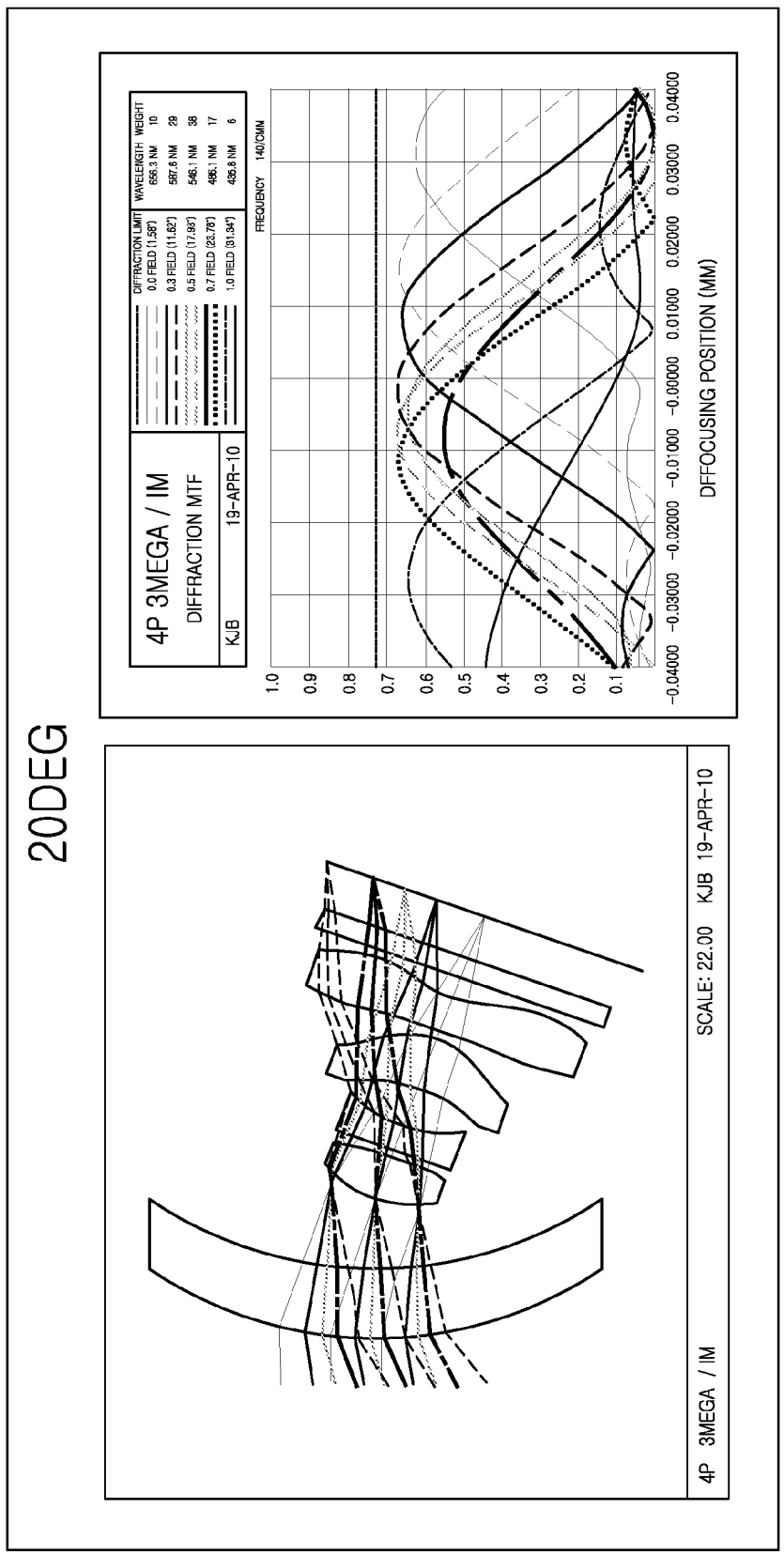
FIG. 6A and FIG. 6B are graphs showing phase differences in a window including a curved surface according a method in the prior art at angles of 20 degrees and 30 degrees, respectively.
Figure 6B:
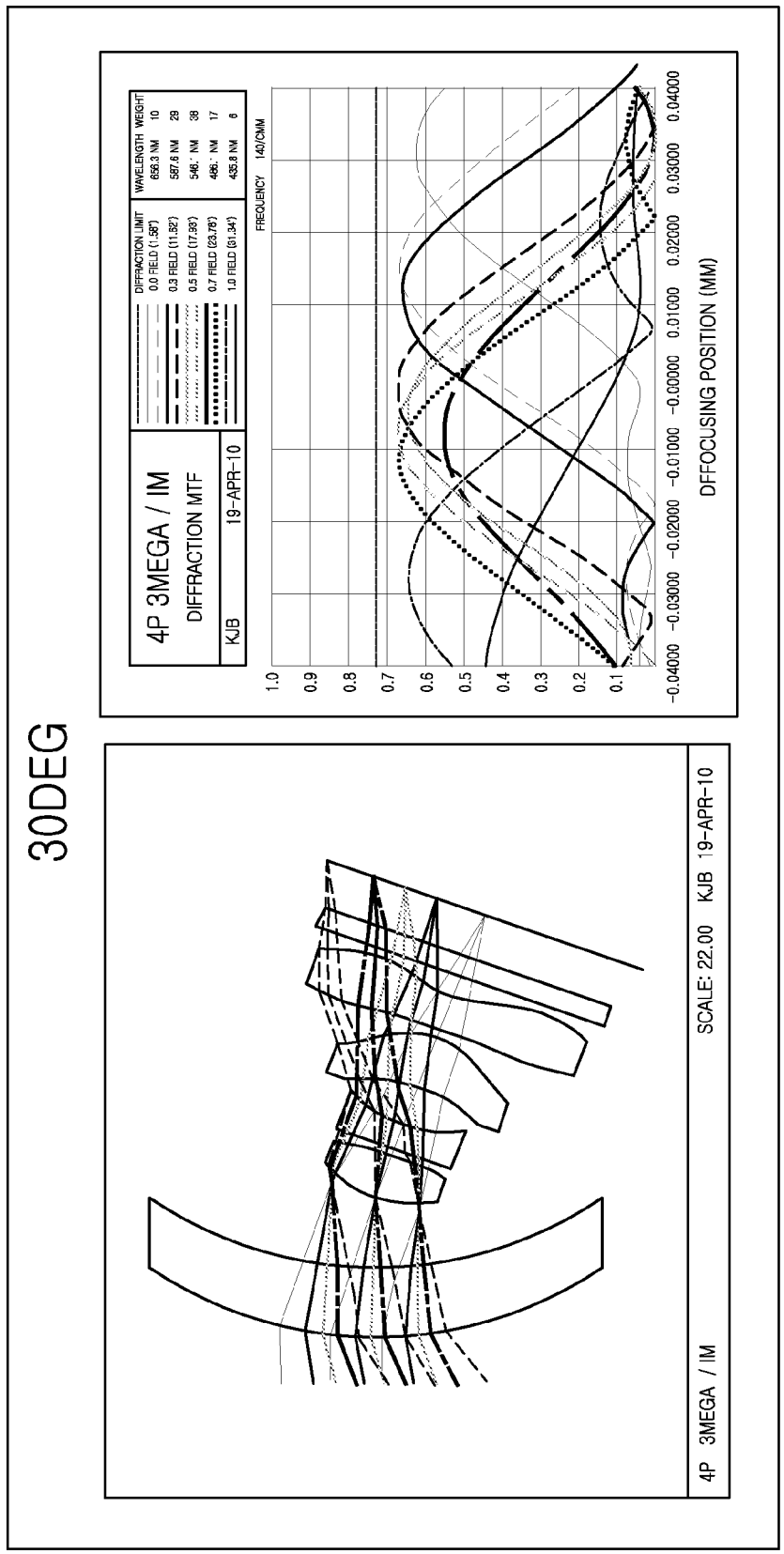
Figure 6C:
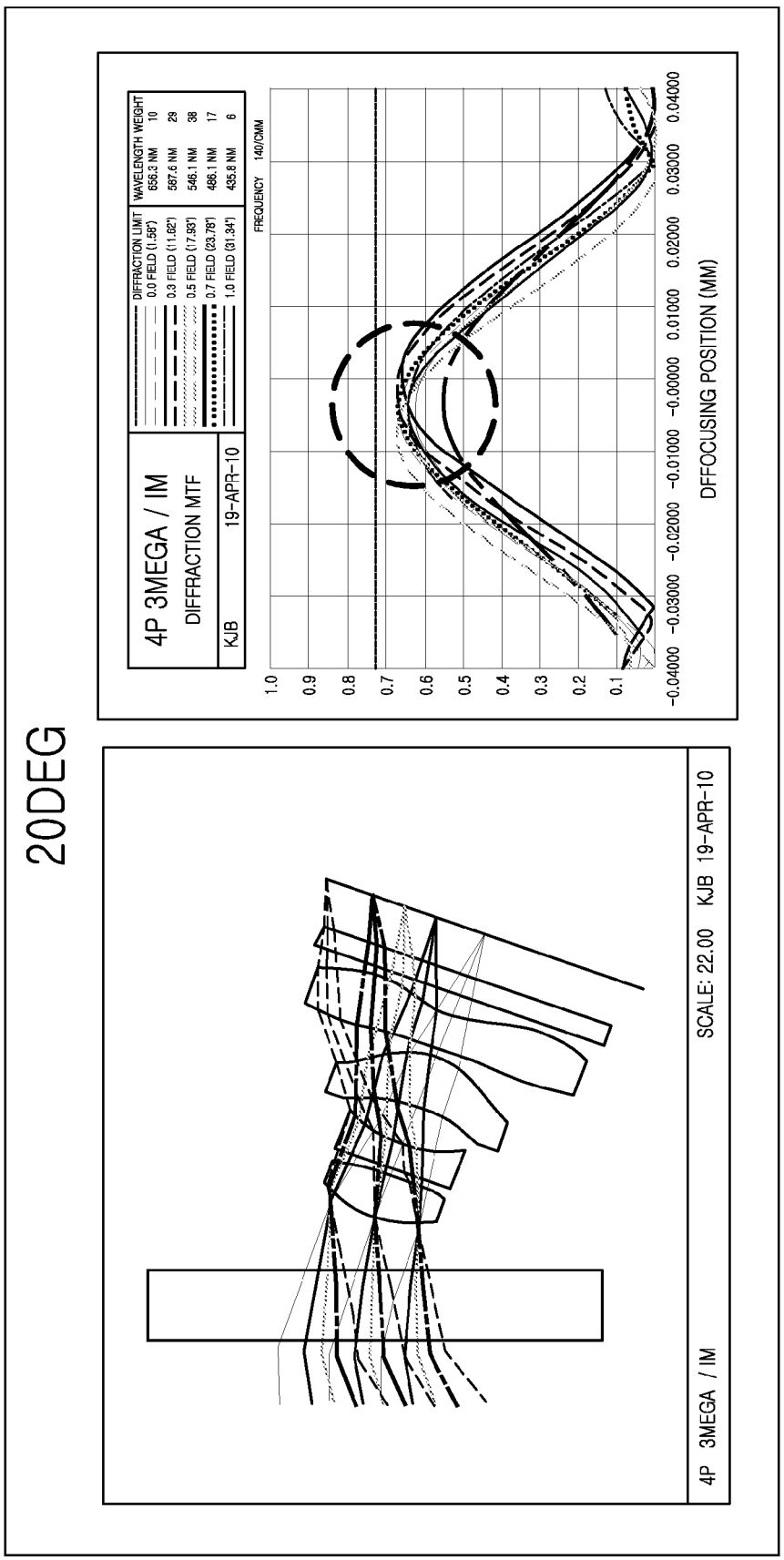
FIG. 6C and FIG. 6D are graphs showing phase differences in a window including an inclined surface according to the present invention at angles of 20 degrees and 30 degrees, respectively.
Figure 6D:
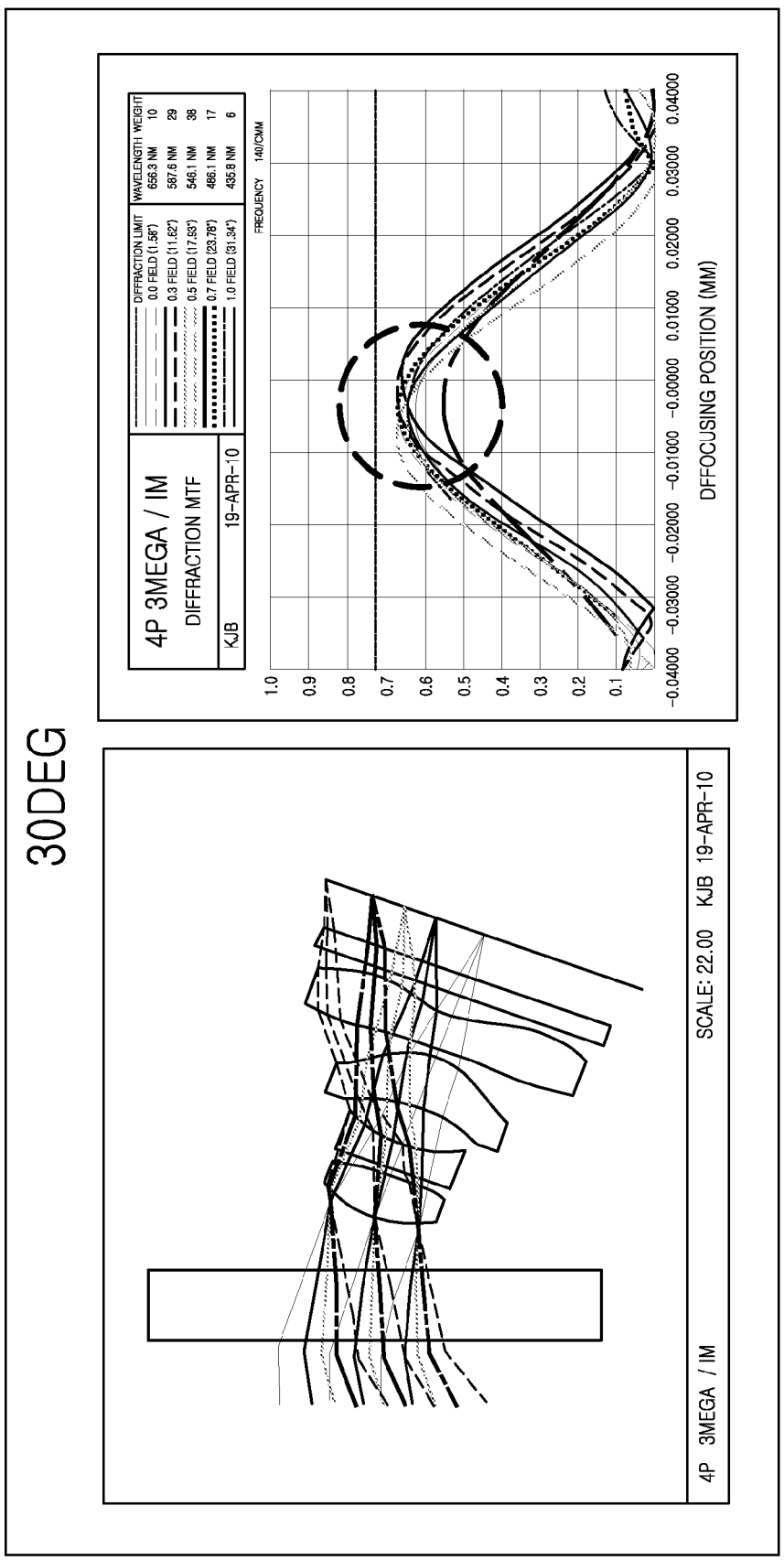

FIG. 6A and FIG. 6B are graphs showing phase differences in a window including a curved surface according a method in the prior art at angles of 20 degrees and 30 degrees, respectively. FIG. 6C and FIG. 6D are graphs showing phase differences in a window including an inclined surface according to the present invention at angles of 20 degrees and 30 degrees, respectively.

As shown in FIGS. 6A-6D, comparison of phase differences of a curved window in the prior art at angles of 20 degrees and 30 degrees in FIG. 6A and FIG. 6B, respectively, with phase differences of an inclined window of the present invention at angles of 20 degrees and 30 degrees as in FIG. 6C and FIG. 6D, respectively, indicates that phase differences have not occurred in the present invention where the inclined window has been implemented. Such a lack of phase differences is illustrated in the dotted circles shown in FIGS. 6C-6D, and represents improved image capture with little or no distortion using the present invention. However, the phase differences of inclined windows in the prior art have occurred and are significant, as shown in the graphs of FIGS. 6A-6B, resulting in significant distortion of image capture using curved windows for camera assemblies in the prior art.

This means that, when the window having an inclined surface is implemented as in the present invention, distortion is not generated when capturing an image of an object and/or internal reflection does not occur during a shooting performance.

Therefore, the windows according to the present invention, as shown in FIGS. 3-5, form a rear surface using an inclined surface to remove distortion by a phase difference and to remove internal reflection during shooting performance even when a front surface of a shooting region is formed using a curved surface having a predetermined curvature, so that a limitation in design of electronic devices in the prior art is removed, and consequently, reliability of the electronic device using the present invention improves to capture images with a camera of the electronic device.

Although the invention has been shown and described with reference to certain exemplary embodiments thereof, it will be understood by those skilled in the art that various changes in form and details may be made therein without departing from the spirit and scope of the invention as defined by the appended claims and their equivalents. For example, the recess be alternatively formed to have a curvature corresponding to a curvature of the window's front surface. Therefore, the scope of the present invention should not be limited to the above-described embodiments but should be determined by not only the appended claims but also the equivalents thereof.

What is claimed is:

1. A window of an electronic device comprising a shooting region in a position corresponding to a camera lens assembly, the window comprising:
    a front surface including the shooting region and having a curved shape; and
    a rear surface including an inclined surface to prevent deterioration of image capture quality, the inclined surface being within the shooting region and facing a surface of the camera lens assembly, the inclined surface being inclined relative to a cross-section of the facing surface of the camera lens assembly across the shooting region;
    wherein inclination of the inclined surface across an entire extent of the shooting region and towards a lateral edge of the window is one of: continuously away from, or continuously towards, the facing surface;
    wherein the curvature of the front surface is determined such that a vertical distance between two points where respective extension lines on opposite sides of an angle of view in the camera lens assembly and the front surface meet is less than 0.05 mm.

2. A window of an electronic device comprising a shooting region in a position corresponding to a camera lens assembly, the window comprising:
    a front surface disposed within at least a portion of the shooting region and having a curved shape; and
    a rear surface including an inclined surface for preventing image capture quality deterioration, the inclined surface being disposed within the shooting region;
    wherein the inclined surface is parallel to a tangential line that passes through a first point on the front surface, the first point being a point at which a first line segment extending from a lens center of the camera lens assembly passes, where the first line segment is at a right angle to a second line segment connecting second and third points of the front surface at which boundary lines on opposite sides of an angle of view of the camera lens assembly intersect the front surface.

3. The window of claim 2, wherein the shooting region is formed to have a margin space of a predetermined distance D beyond a region between two points where an extension line of an angle of view of the camera lens assembly and the front surface meet to prevent a malfunction due to assembly tolerance.

4. The window of claim 2, wherein first and second opposite ends of the inclined surface in cross-section are formed to be lower than adjacent portions of the rear surface.

5. The window of claim 4, wherein a boundary portion between the inclined surface and the rear surface is tapered.

6. The window of claim 2, wherein the inclined surface is formed to have a first surface portion starting from an adjacent portion of the rear surface and a second surface portion lower than the adjacent portion of the rear surface.

7. The window of claim 6, wherein a boundary portion between the inclined surface and the rear surface is tapered.

8. An electronic device comprising:
a camera lens assembly, and
a transparent window having a front surface facing outward of the electronic device, and having a recess formed in a rear surface thereof, the recess facing a surface of the camera lens assembly and having a portion sloped in cross-section relative to a cross section of the facing surface of the camera lens assembly, with a slope that is one of:
 continuously positive across an entire extent of the facing surface; or
 continuously negative across the entire extent of the facing surface;
wherein the recess is formed to have an inclined surface which is inclined in relation to a curvature of the outer surface; and
wherein when a first line segment connecting two points where an extension line of an angle of view of the camera lens assembly and the outer surface meet, and a second line segment extending from a lens center of the camera lens assembly meet at a right angle, the inclined surface is formed to have the same slope as a slope of a tangential line that passes through a point of the outer surface positioned on the second line segment.

9. The window of claim 2, wherein the inclined surface includes a second inclined surface attached on the rear surface within the shooting region.

10. A window of an electronic device comprising a shooting region in a position corresponding to a camera lens assembly, the window comprising:
a front surface including the shooting region and having a curved shape; and
a rear surface including an inclined surface to prevent deterioration of image capture quality, the inclined surface being within the shooting region and facing a surface of the camera lens assembly, the inclined surface being inclined relative to a cross-section of the facing surface of the camera lens assembly across the shooting region;
wherein inclination of the inclined surface across an entire extent of the shooting region and towards a lateral edge of the window is one of: continuously away from, or continuously towards, the facing surface;
wherein the shooting region is formed to have a margin space of a predetermined distance D beyond a region between two points where an extension line of an angle of view of the camera lens assembly and the front surface meet to prevent a malfunction due to assembly tolerance, the distance D being in a range of 0.2 mm to 0.3 mm.

11. An electronic device comprising the window of claim 2 and the camera lens assembly.

12. An electronic device comprising the window of claim 1 and the camera lens assembly.

13. An electronic device comprising the window of claim 10 and the camera lens assembly.

14. The electronic device of claim 8, wherein the portion of the recess sloped in cross section is linear across the entire extent of the facing surface.

15. The electronic device of claim 8, wherein the recess is formed to have a curvature corresponding to a curvature of the outer surface.

* * * * *